United States Patent
Wagner et al.

[15] 3,661,114
[45] May 9, 1972

[54] AMPHIBIOUS VEHICLE

[72] Inventors: Gerhard Wagner, Mainz-Lerchenberg; Friedrich Kroll, Mainz; Horst Gleich, Heilbronn-Bockingen; Georg Kessler, Oberwesel, all of Germany

[73] Assignee: Klockner-Humboldt-Deutz Aktiengesellschaft, Koln-Deutz, Germany

[22] Filed: June 8, 1970

[21] Appl. No.: 44,025

[30] Foreign Application Priority Data

June 10, 1969 Germany..................P 19 29 246.7

[52] U.S. Cl..................................................115/1 B
[51] Int. Cl. .................................................B60f 3/00
[58] Field of Search....................................115/1 B

[56] References Cited

UNITED STATES PATENTS

3,269,349   8/1966   Gehlen...................................115/1 B
3,446,176   5/1969   Grange et al.........................115/1 B Primary Examiner—Andrew H. Farrell
Attorney—Walter Becker

[57] ABSTRACT

An amphibious vehicle having an elongated bouyant main body with ground wheels at the ends for ground travel and propulsion means for water travel. Auxiliary bouyant bodies on top of the main body can be pivoted outwardly thereon at opposite sides of the main body to form a platform for ferrying or for a bridge. When the auxiliary bodies are pivoted inwardly on top of the main body, the vehicle is compact and can be transported in a rail car. When the auxiliary bodies are pivoted outwardly, a wide platform is provided. Differing positions for use are realized by folding operations relative to the auxiliary bodies with pure pivoting movements. Land vehicle use, floating body use, and ramp use are feasible in compact and folded apart configurations of auxiliary bodies.

15 Claims, 17 Drawing Figures

AMPHIBIOUS VEHICLE

The present invention relates to an amphibious vehicle and, more specifically, to an amphibious bridge and ferrying vehicle with additional or auxiliary floating bodies which, when the vehicle is driving over land, are located above the main floating body forming the vehicle body and which are adapted at both sides to be laterally folded outwardly about pivots provided at the longitudinal sides of the main floating body.

Vehicles of this type, which are primarily intended for military purposes, have to have cross-sectional profiles within the limits permissible to allow loading the vehicle onto trains. When converting the vehicle from use on land to use as a floating bridge or ferrying vehicle, it is necessary that such conversion be effected in a minimum of time and with a minimum of personel.

A further requirement normally to be met by vehicles of the above mentioned type consists in that when the vehicle is to be used as bridge or ferrying vehicle, it must be possible by means of the auxiliary floating bodies in wide or narrow coupling arrangement to provide two different sizes for the overall carrying platforms and for correspondingly different loads. To this end it has been suggested, for instance, according to German Pat. No. 1,105,301, to compose the auxiliary floating bodies each of two sectional floating bodies which are superimposed upon the main floating body and are interlinked. In this way it will be possible to unfold the auxiliary floating bodies from their position for driving over land either laterally outwardly as a unit (for narrow coupling) or by a further unfolding of the sectional floating bodies to increase the size of the carrying platform (for wide coupling). This solution of the problem does, however, not meet the further requirement according to which the additional floating bodies must be usable as ramps for vehicles moving onto or off the platforms so that special vehicles for this purpose will not be needed.

It is, therefore, an object of the present invention so to improve amphibious vehicles of the above mentioned general type that the last mentioned additional conditions will be met.

This object and other objects and advantages of the invention will appear more clearly from the following specification in connection with the accompanying drawings, in which.

The amphibious bridge and ferrying vehicle according to the present invention is characterized primarily in that the auxiliary floating bodies are adapted as a unit to be folded about pivots which are located between the main floating body and the floating body sections which during the use of the vehicle as a land vehicle are the upper floating body sections, said pivots being located above the main floating body at half the height of the floating body sections. The vehicle according to the present invention is furthermore characterized in that the floating body sections can additionally be pivoted by 180° in the same folding direction as before about pivots which are arranged at the longitudinal sides between the floating body sections at the level of the platform of the main floating body.

In this way, i.e. after the second pivoting operation, all floating body sections having a continuous height form a loading surface or track which is at a right angle with regard to the longitudinal direction of the vehicle and at a maximum amounts to three times the width of the main floating body which is the vehicle body and thus furnishes favorable conditions for a wide coupling.

The floating body section which after the folding out step forms the outermost floating body section is, according to the present invention, subdivided once more in such a way that it forms the end member of a ramp which tapers so as to define an acute angle and is pivotable from below about pivots. When the auxiliary floating bodies folded over the vehicle body take up half of the width of the vehicle body, the ramp will at a maximum have three times the length of said half width. The thus formed ramp of customary length differs from ramps of heretofore known vehicles used for the same purpose advantageously in that it is folded by a folding operation with pure pivoting movements. Such an arrangement can be effected fully mechanically. The ramp end members are expediently subdivided into a plurality, for instance four, of individual members each of which alone is pivotally connected to the outer floating body section in order to permit an adaptation to a possible unevenness of the banks.

According to a further development of the invention, the floating body section which, when occupying its normal position on the vehicle for driving over land, is the upper floating body section has an outwardly located inclined surface which, on one hand, permits the adaptation of the vehicle to the permissible contour for its transportation on a train and, on the other hand, makes possible the pivoting of the auxiliary floating body from the horizontal position downwardly to form a ramp. It is the specific way of pivoting the various elements which makes it possible according to the present invention to meet the above referred to indispensable requirements.

For purposes of effecting a narrow coupling of the floating vehicles, there are provided further pivots which are adapted selectively to be inserted at the level of the platform at the outer edge of the main floating body about which the folding of the auxiliary floating bodies as a unit is made possible. In this way, the not further folded-out auxiliary floating bodies increase the buoyancy of the vehicle and thereby also the load ability.

For purposes of outwardly folding the auxiliary floating bodies on both sides of the vehicle, it is suggested that a control cylinder interconnects the linkage means which on both sides extend upwardly beyond the platform, and it is furthermore suggested that additional control cylinders pivotally connect these linkage means to the auxiliary floating bodies preferably with the floating body sections which, when the vehicle is used as a land vehicle, form the upper floating body sections. In order to realize favorable conditions for the considerable pivoting angle of 180°, the said linkage means preferably have their pivot points arranged along a triangle. This adjusting device is without any change in the linkage points suitable for both described types of folding the auxiliary floating bodies for purposes of wide and narrow coupling.

Additional control cylinders are provided for pivoting the floating body sections relative to each other.

The employment of foldable floating body sections as ramps will, for purposes of adapting the ramps to the respective height of the banks, make it necessary that the ramps are adjustable relative to the main floating body. To this end, inconformity with the present invention, for purposes of connecting the main floating body with the floating body sections which, after the folding operation, are located directly adjacent to the main floating body, there are provided pivots at the level of the platform, and in spaced relationship thereto and below the same there are arranged an adjusting means, preferably in the form of hydraulic cylinder piston means. The pivot connection at these two areas may be effected directly following the first unfolding step (for wide coupling), according to which the auxiliary floating bodies as a unit are pivoted by 180°. The hydraulic cylinders which are linked to the main floating body will, on one hand, bring about the necessary pivoting of the ramp about the pivots at the level of the platform and, on the other hand, after the ramp has been placed upon the bank form the final member of a rigid triangular framework which, when a vehicle drives thereover, will prevent a change in the trim of the main floating body.

The hydraulic cylinders which are pivotally connected to and supported by the main floating body are, also when a narrow coupling is desired, suitable, following the outward folding of the auxiliary floating bodies about the pivots located at the level of the platform at the upper lateral edges of the main floating body, to secure or establish a rigid connection between the main floating body and the auxiliary floating bodies. When the vehicle is used as a land vehicle, the hydraulic cylinders are advantageously located in recesses provided in the side walls of the main floating body and are adapted to be pivoted by lower pivots located in said recesses, for instance, by means of an auxiliary cylinder each, into a position for connection with the auxiliary floating bodies.

Figure 1:
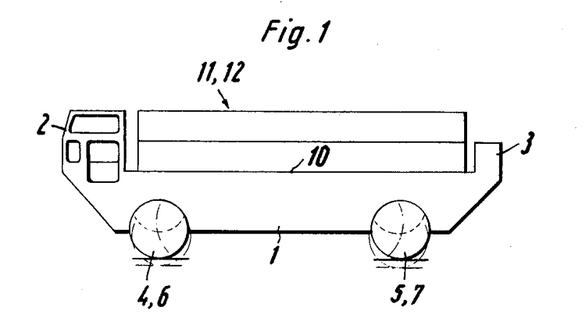
FIG. 1 is a side view of a vehicle according to the invention and shows the position of the auxiliary floating bodies in their position for driving over land.
Figure 2:
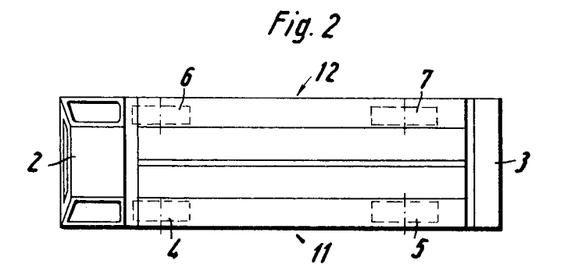
FIG. 2 illustrates a top view of the vehicle of FIG. 1.
Figure 3:
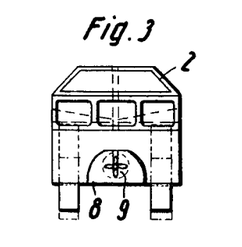
FIG. 3 is a front view of the vehicle of FIG. 1.
Figures 6, 7:
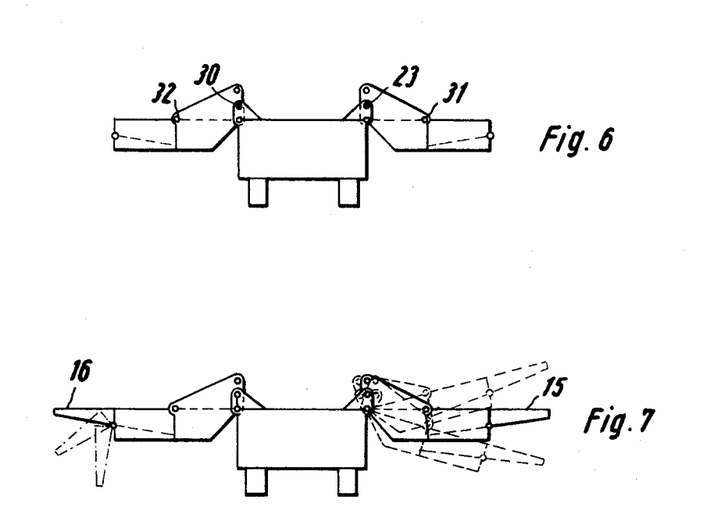
FIG. 6 shows the vehicle of Fig. 1 with laterally folded out sectional floating bodies in a position for wide coupling with adjacent vehicles.
FIG. 7 shows the vehicle according to the invention with laterally folded-out sectional floating bodies folded out so as to form bank ramps.

Referring now to the drawings in detail and FIGS. 1 to 3 thereof in particular, these figures illustrate the elongated boxlike main floating body 1 of an amphibious bridge and ferrying vehicle which at the front end is provided with the driver's cab 2 and at the rear end has a framework or railing 3. Wheels 4,5 and 6,7 are linked to the main floating body 1 for driving the vehicle over land and, more specifically, in such a way that the main floating body, when driving over land, will have a high ground clearance whereas, when the vehicle is used as a water vehicle, the wheels can be pulled into the lower edge of the bottom as indicated by dot-dash lines in FIGS. 1 to 3 so that the wheels will not interfere with the floating of the vehicle. The propulsion of the vehicle, when used as a water vehicle, will be effected by means of a propeller 9 which is arranged below the cab 2 in a passage 8. On the platform surface 10 of the main floating body 1 between the cab and the railing 3 there are provided box-like auxiliary floating first and second bodies 11 and 12 which, as indicated in FIG. 2, extend over half the width of the main floating body 1 and, when occupying their normal position when the vehicle is used as a land vehicle, do not extend beyond the sides of the vehicle. As will be seen from FIG. 4, the box-like auxiliary floating first and second bodies 11 and 12 are subdivided into individual floating body sections 13, 14, 15 and 16, 17, 18, the floating body sections 13, 14, 15 being interconnected by links, and similarly the floating body sections 16, 17, 18 are likewise interconnected by links. When the vehicle is used as a land vehicle, the respective floating body sections are folded upon each other. As indicated in FIG. 7, the sections 15 and 16 form the end members of the auxiliary floating bodies when folded outwardly to form a bank ramp.

Figure 4:
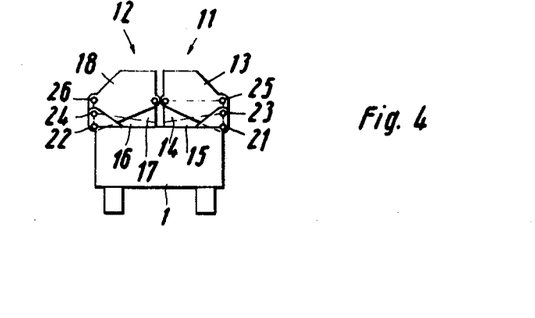
FIG. 4 shows a front view of the vehicle of Fig. 1 without the driver's cab and with the auxiliary floating bodies in folded-in position.
Figure 5:
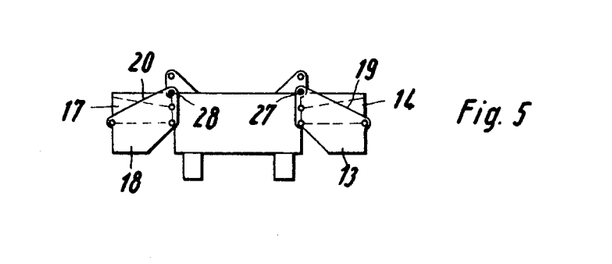
FIG. 5 is a view similar to that of FIG. 4 but with the auxiliary floating bodies laterally folded outwardly by 180° in a position for narrow coupling with adjacent vehicles.

In FIG. 4, the auxiliary floating bodies 11 and 12, while occupying their position for driving the vehicle over land, are located above the main floating body 1. The sections 13 and 18 are provided with outer inclined surfaces which make it possible to adapt the overall contour of the vehicle to the profile required for loading the vehicle on trains and which also permit a downward pivoting of the auxiliary floating bodies when folded outwardly to form a ramp.

The sections 13 and 18 have their ends provided with side walls 19 and 20 which, according to FIG. 4, protrude downwardly beyond the contour of the floating body sections up to the platform surface 10 and at points equalling the total height and half the height of the sections 14 and 17 are provided with bores 21, 22, 23 and 24, 25, 26 for receiving pivots. The main floating body 1 above the platform surface 10 has protrusions with counter bores at the level of the platform surface and at a point equaling half the height of the sections 14 and 17 for selectively receiving pivots 27, 28 and 29, 30 about which the auxiliary floating bodies 11 and 12 are as a unit selectively laterally pivotable.

According to FIG. 4, the auxiliary floating bodies 11 and 12 are laterally of the main floating body 1 folded as a unit by 180° about the pivots 27 and 28. The upwardly pointing surfaces of the sections 14 and 17 form with the platform surface 10 of the main floating body 1 a continuous additional loading surface or track located at the level of the sections 14 and 17. In the illustrated position, the total platform surface is, for instance, twice as large as the platform surface 10 of the main floating body 1.

According to FIG. 6, the sections 13, 14 and 17, 18 have been folded into a position for wide coupling with adjacent vehicles. This position of the sections 13, 14 and 17, 18 is obtained by an outward folding of the auxiliary floating bodies 11 and 12 as a unit about the pivots 29 and 30 and by a subsequent pivoting to the outside of the sections 14 and 17 about the pivots 31 and 32.

According to FIG. 7, the floating body sections 13, 14 and 17, 18 have, together with the respective pertaining end members 15 and 16, been fully folded outwardly laterally of the main floating body. The thus unfolded auxiliary floating bodies form a bank ramp which is obtained from the position for wide coupling according to FIG. 6 by folding outwardly from below the end members 15 and 16. The folding of the end members 16 from the respective floating body section 17 is indicated, for instance, by two intermediate positions outlined in dot-dash lines. Furthermore, there is shown in FIG. 7 that the bank ramp as a unit, as indicated by dot-dash lines on the right-hand side, is adapted to be pivoted from the horizontal plane upwardly and downwardly. In this way, it is possible to adapt the bank ramp to the respective height of the bank.

Figure 8:
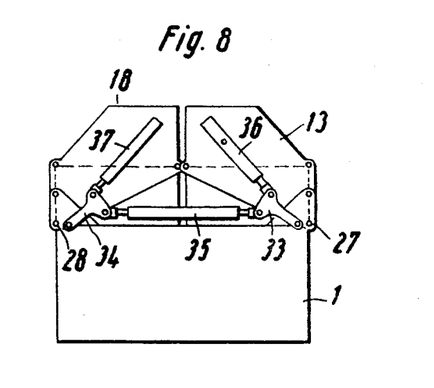
FIG. 8 is a front view of a vehicle without driver's cab with folded-in auxiliary floating bodies and also shows the arrangement of the hydraulic cylinders employed for the folding of the auxiliary floating bodies.
Figure 9:
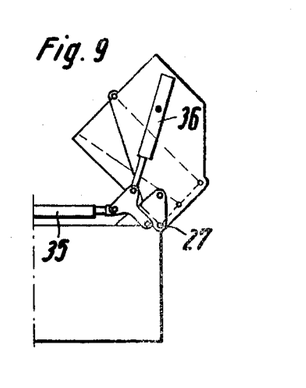
FIG. 9 shows the lateral folding operation of the auxiliary floating bodies with the latter occupying an intermediate position.
Figure 10:
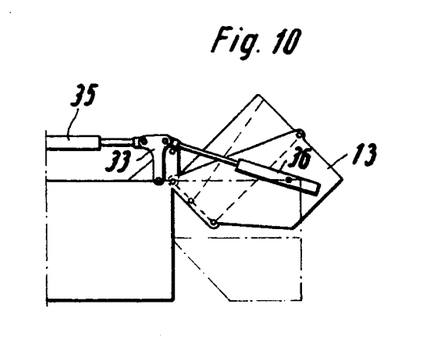
FIG. 10 shows a further intermediate position of the auxiliary floating bodies and also shows the end position of said bodies.
Figure 11:
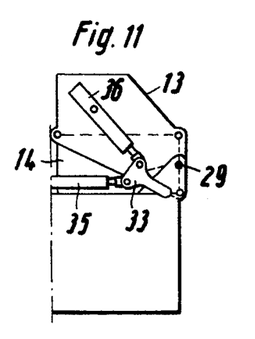
FIG. 11 shows half of the front view of the vehicle with folded-in auxiliary floating bodies and also shows the pivot provided for the wide coupling.
Figure 12:
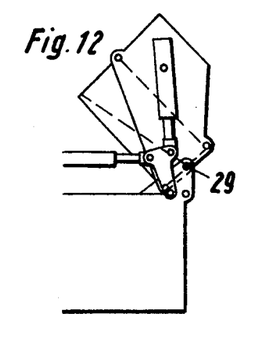
FIG. 12 shows an intermediate position which the auxiliary may occupy when pivoting about the pivot prior to reaching their wide coupling position according to FIG. 11.
Figure 13:
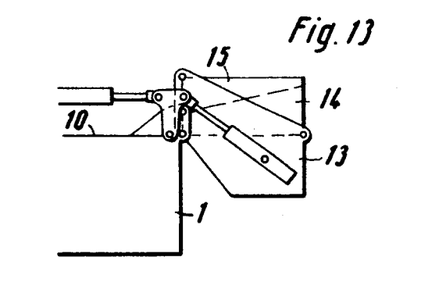
FIG. 13 shows an auxiliary floating body when folded outwardly by 180°.

FIGS. 8 – 10 illustrate the folding outwardly of the auxiliary floating bodies for narrow coupling by means of a device provided therefor. In front of the ends of the auxiliary floating bodies adjacent the end faces, (see also FIG. 16), triangular linkage means 33, 34 are at both sides arranged on the main floating body 1 at the level of the platform near the pivots 27, 28. Between these linkage means there is provided a hydraulic double cylinder piston system 35 with pistons guided therein at both sides thereof, the piston rods of said cylinder piston system being linked to the upper ends of the linkage means 33, 34. Further hydraulic cylinder piston means 36, 37 which are rotatably guided on the floating body sections 13, 18 have their piston rods likewise pivotally connected to the linkage means 33, 34.

The supply of pressure oil to the hydraulic cylinders and the control thereof have not been illustrated in the drawing, inasmuch as they do not directly pertain to the invention.

From FIGS. 8 – 10 it will be seen that all three hydraulic cylinders take part in the folding of the auxiliary floating bodies by 180°, and it will also be noticed that the first portion of the pivoting movement is effected primarily by the cylinder piston systems 36, 37.

Figure 14:
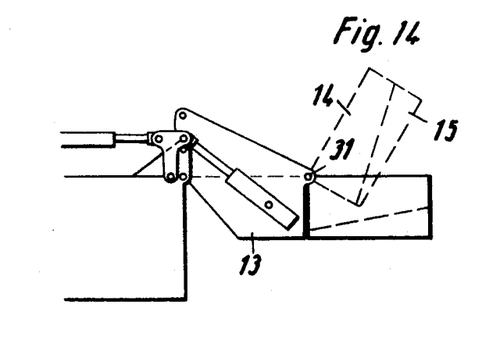
FIG. 14 illustrates the folding operation of a sectional floating body from the position of FIG. 13 to a position for wide coupling with an adjacent amphibious bridge vehicle.

According to FIGS. 11 – 14, which illustrate the pivoting operation for wide coupling, the pivots 29, 30 are introduced into the corresponding bores 23, 24 of the side jaws of bodies 13, 18 at half the height of the floating bodies 14, 17. Furthermore, said pivots 29, 30 are introduced into the counter bores of the protrusions of the main floating body. The pivoting operation of the auxiliary floating bodies as a unit about these pivots is carried out by the same hydraulic cylinder piston systems through triangular link means as previously described for narrow coupling. In its end position sown in FIG. 13, the platform surface of the floating body sections 13, 18 is located at the level of the platform surface 10 of the main floating body 1. FIG. 14 illustrates the subsequent unfolding of the floating body sections 14, 15 and 16, 17 about the pivots 31, 32 provided between the floating body sections 14, 15 and 16, 17. The device for this actuation or operation is not illustrated.

Figure 15:
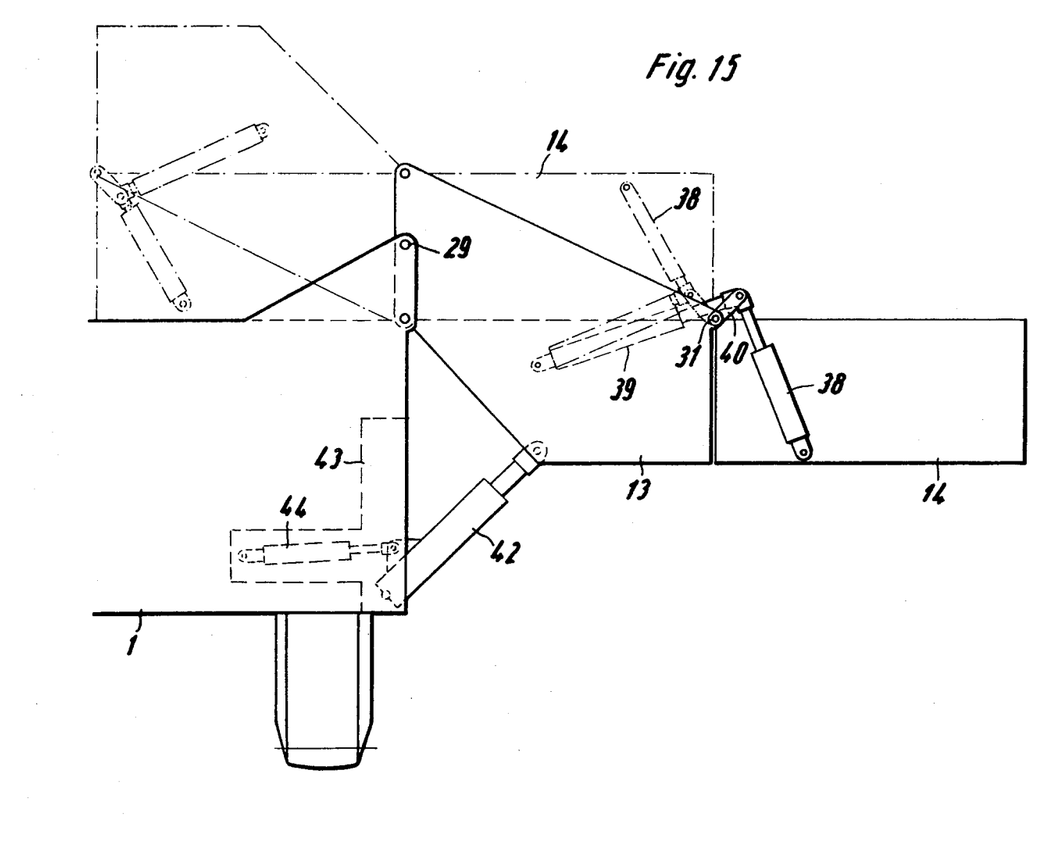
FIG. 15 illustrates on a somewhat larger scale than the preceding figures half a rear view of the vehicle without the frame work at the end face, the vehicle occupying a position for wide coupling together with the hydraulic cylinder piston systems for folding the sectional floating bodies outwardly.

FIG. 15 shows the device for unfolding the outer floating body sections 14, 13 on one side of the vehicle. Hydraulic cylinders 38, 39 which are provided at both end faces have one end thereof linked to a floating section body 14, 13 each end have their other end pivotally connected to a linkage member 40. These linkage members have their inner ends coaxially arranged with regard to the pivots 31 effective between the floating body sections 13, 14. The pivoting of the partial floating body 14 is effected by means of this device in a manner corresponding to the above described pivoting of the auxiliary floating bodies as a unit.

FIG. 15 also shows further hydraulic cylinder piston means 42 which have their lower end pivotally connected to the main floating body 1 and have their upper end of their piston rod pivotally connected to the floating body section 13. The last mentioned pivotal connection is effected after the floating body has been folded outwardly. Prior thereto, the cylinder piston systems 42 were located in recesses 43 of the main floating body from which recesses they have been pivoted outwardly by means of an auxiliary cylinder piston system 44. The double acting cylinder piston systems 42 which are distributed in the longitudinal direction of the vehicle as indicated in FIG. 16 form the closing member of a triangular system between the main floating body and the auxiliary bodies.

Figure 16:
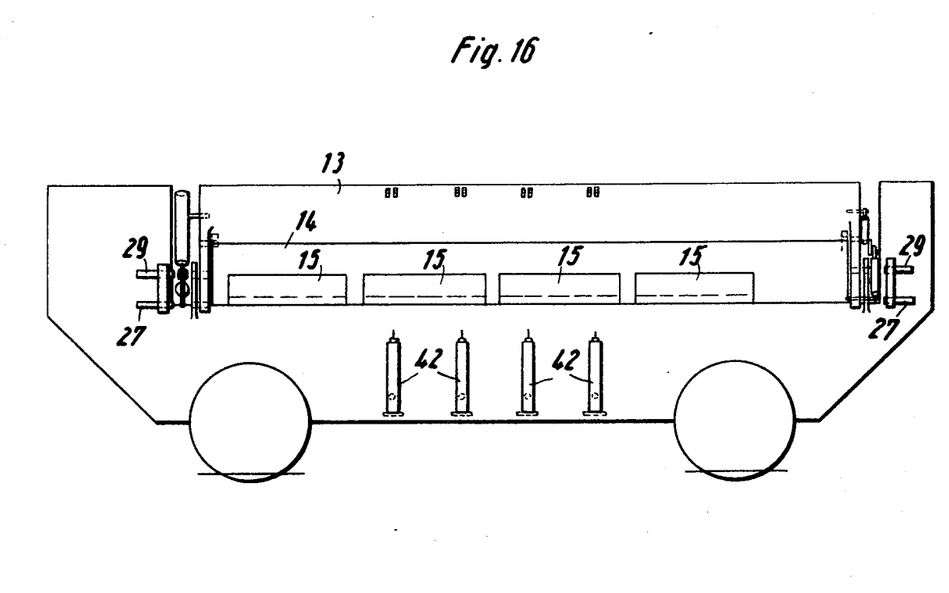
FIG. 16 shows a side view of the vehicle in position for driving over land and also shows the arrangement of the hydraulic cylinders.

The side view of the vehicle, as shown in FIG. 16, illustrates the axially displaceable pivots 27 at the level of the platform of the main floating body and also shows the pivots 29 at half the height of the floating body section 14. By selectively introducing one or the other pivots into the corresponding bores of the side jaws of the floating body section 13 and the protrusion of the main floating body, the folding operation for narrow and wide coupling is made possible. FIG. 16 also shows the subdivision of the ramp end members 15, each of which is pivotally journalled by itself on the floating body section 14.

Figure 17:
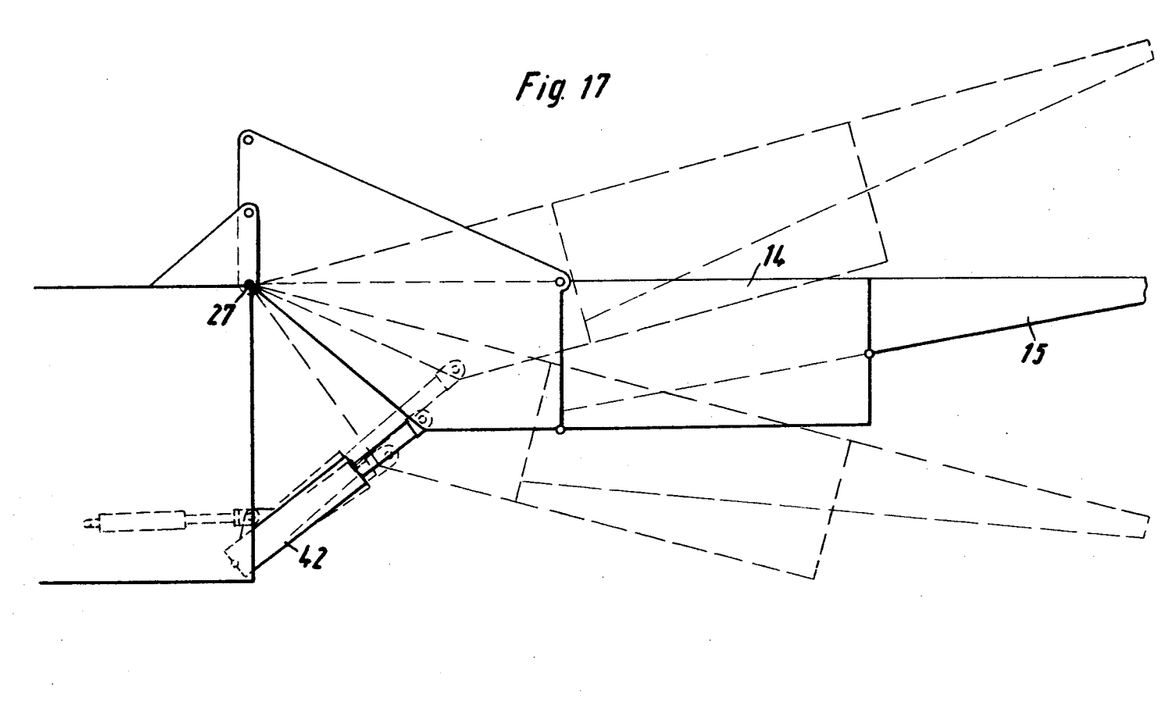
FIG. 17 illustrates half a front view of the vehicle with the sectional floating bodies fully folded outwardly to form bank ramps while occupying different angular positions, and also shows the pertaining hydraulic cylinder.

FIG. 17, in which the ramp end members 15 have been folded out of the recesses at the bottom side of the floating body section 14, illustrates the pivotability of the ramp together about the pivots 27 by means of the hydraulic cylinder piston system 42 for adaptation to the respective height of the bank and, more specifically illustrates this pivotability in three positions.

It is, of course, to be understood that the present invention is, by no means, limited to the particular construction shown in the drawings, but also comprises any modifications within the scope of the appended claims.

What is claimed is:

1. A vehicle adapted for land travel and for water travel and for forming floating platforms, said vehicle comprising an elongated floatable box-like main body forming a frame for the vehicle and having ground wheels at opposite ends, a pair of floatable box-like auxiliary first bodies extending longitudinally along the top of said main body in side by side relation, a floatable box-like auxiliary second body extending along the top of each said first body, elements of first pivot means at the sides of said main body and the adjacent sides of said second bodies for pivotally connecting said main body to said second bodies for pivotal movement of said first and second bodies as a unit 180° outwardly on the main body to a position at the side of said main body wherein the now upwardly facing surface of the respective first body forms a lateral extension of the upper surface of said main body, elements of second pivot means at the sides of said main body and the adjacent sides of said second bodies for pivotally connecting said main body to said second bodies for pivotal movement of said second bodies 180° outwardly on the main body to a position wherein the now upwardly facing surface of the respective second body forms a lateral extension of the upper surface of said main body, and elements of third pivot means on said first and second bodies pivotally connecting each first body to the pertaining second body for pivotal movement of the first body 180° outwardly on the pertaining second body when the latter is pivoted outwardly on said main body about said second pivot means, the last mentioned pivotal movement of said first body moving the first body to a position upper surface of the said first body forms a lateral continuation of the upper surface of the pertaining second body.

2. A vehicle according to claim 1, which includes means for retracting said ground wheels upwardly on said main body and means for propelling said vehicle when floating.

3. A vehicle according to claim 1, in which said main body comprises members upstanding therefrom at the ends at the sides thereof and the elements of said first pivot means on said main body are located in said members at about the level of the upper surface of said main body and the elements of said second pivot means on said main body are spaced upwardly thereupon in said members a distance equal to about half the height of said first body, and said elements of said third pivot means on said second body being located at the outer uppermost corner of said second body when the latter is in the outwardly pivoted position thereof.

4. A vehicle according to claim 3, in which the corners of said second bodies which form the upper outer corners thereof when the first and second bodies are pivoted inwardly on top of the main body are beveled off to adapt the contour of the vehicle to a rail car and also to permit movement of said second bodies downwardly from their pivoted outwardly position on said main body.

5. A vehicle according to claim 3, in which said second bodies comprise end members extending downwardly at the ends of said first bodies when said first and second bodies are disposed on top of said main body and at the outer edges overlapping the said members upstanding from said main body, said end members having bores therein in vertically spaced relation in said outer edges thereof, said bores forming the elements of said first and second pivot means on said second bodies.

6. A vehicle according to claim 3, in which adjacent ones of said vehicles can be coupled together in side by side relation when the said first and second bodies are in inwardly pivoted position by availing of the bores in said members upstanding from said main body.

7. A vehicle according to claim 3, in which each first body comprises tapered body section means pivotally connected thereto and in retracted position being disposed within the outer limits thereof, fourth pivot means connecting each said first body to the respective said tapered body section means for pivotal movement of the latter to extended position on the respective said first body when the latter is disposed at the side of the respective second body, said fourth pivot means being so disposed that in said extended position of the tapered body section means the upper surface thereof forms a lateral continuation of the upper surface of the pertaining first body.

8. A vehicle according to claim 7, in which each tapered body section means comprises a plurality of individual tapered body sections distributed longitudinally of the respective first body, said fourth pivot means comprising an individual fourth pivot connecting each said tapered body section to the pertaining first body.

9. A vehicle according to claim 7, in which said end members on said second bodies comprise further bores which register with the bores which pertain to said first pivot means in said members upstanding from said main body when said second bodies are in pivoted out position about said second pivot means thereby to provide pivot means about which said first and second bodies and tapered body section means can pivot as a unit upwardly and downwardly from a horizontal position when in outwardly pivoted position, said second bodies being bevelled off on those corners which are on the bottom toward said main body in pivoted out position of said second bodies to permit said downward pivoting of said first and second bodies and tapered body sections as a unit.

10. A vehicle according to claim 7, which includes means preventing said fourth pivot means from buckling downwardly when said tapered body section means is in extended position.

11. A vehicle according to claim 1, which includes fluid operable means operatively connected to said second bodies for pivotal movement thereof between inner positions on top of said main body to outer positions at the sides of said main body.

12. A vehicle according to claim 11, in which said fluid operable means includes fluid motor means connected between said main body and each of said second bodies.

13. A vehicle according to claim 12, which includes further fluid motor means connected between said first and second bodies for relative pivotal movement thereof.

14. A vehicle according to claim 11, which includes link means at each end of said main body pivoted to said main body and upstanding therefrom near the sides of the main body, said fluid operable means comprising a first fluid motor connected between the link means at each end of said main body and a second fluid motor connected between each said link means and the adjacent end of the adjacent said second body.

15. A vehicle according to claim 14, in which the connection of said second fluid motors to said link means and to said second bodies are so located that the line of action of each second fluid motor is at a level above the said elements of said first and second pivot means on said main body pertaining to the respective second body in all pivoted positions of the second body.

* * * * *